United States Patent
Culp et al.

(10) Patent No.: US 9,573,854 B2
(45) Date of Patent: Feb. 21, 2017

(54) NUTRIENT ENHANCED BIOSOLIDS PELLETS

(71) Applicants: Synagro Technologies, Inc., Houston, TX (US); The Andersons, Inc., Maumee, OH (US)

(72) Inventors: Larry Culp, Sanford, FL (US); Joseph David Hodges, Orlando, FL (US); Kenneth L. Wetherington, Lake Wales, FL (US); Terry Lee Wiseman, Lakeland, FL (US)

(73) Assignees: The Andersons, Inc., Maumee, OH (US); Synagro Technologies, Inc., Houston, TX (US)

( * ) Notice: Subject to any disclaimer, the term of this patent is extended or adjusted under 35 U.S.C. 154(b) by 0 days.

(21) Appl. No.: 14/141,100

(22) Filed: Dec. 26, 2013

(65) Prior Publication Data
US 2014/0106970 A1    Apr. 17, 2014

Related U.S. Application Data

(62) Division of application No. 12/898,941, filed on Oct. 6, 2010, now Pat. No. 8,617,285.

(Continued)

(51) Int. Cl.
| | |
|---|---|
| C05B 17/00 | (2006.01) |
| C05D 1/02 | (2006.01) |
| C05F 9/04 | (2006.01) |
| C05G 3/00 | (2006.01) |
| C05G 3/02 | (2006.01) |

(Continued)

(52) U.S. Cl.
CPC .............. *C05B 17/00* (2013.01); *C05C 11/00* (2013.01); *C05D 1/00* (2013.01); *C05D 1/02* (2013.01); *C05F 9/04* (2013.01); *C05G 3/0088* (2013.01); *C05G 3/02* (2013.01); *C05G 3/06* (2013.01); *Y02P 20/145* (2015.11)

(58) Field of Classification Search
CPC .. C05B 17/00; C05D 1/00; C05D 1/02; C05C 11/00; C05G 3/02; C05G 3/0088; C05G 3/06; C05G 3/0041; C05F 9/04
USPC .................................................. 71/31–64.13
See application file for complete search history.

(56) References Cited

U.S. PATENT DOCUMENTS

| | | | |
|---|---|---|---|
| 3,655,396 A | 4/1972 | Goto et al. | |
| 3,734,707 A * | 5/1973 | Seymour | .................... B01J 2/28 71/30 |

(Continued)

*Primary Examiner* — Jennifer A Smith
(74) *Attorney, Agent, or Firm* — Avery N. Goldstein; Blue Filament Law PLLC

(57) ABSTRACT

A dry, flowable fertilizer is provided that includes multiple dry, flowable biosolids pellets. Each of the pellets has a pellet surface. Potassium salt grains are adhered to the pellet surfaces and a dust control agent coating is applied to retain the grains on the pellet surfaces. The resultant dry, flowable fertilizer has higher potassium loadings to the potassium salt grains than previous biosolids based fertilizers. A process of forming a fertilizer is also provided that includes tumbling dry, flowable biosolids pellets with powdered potassium salt grains to form a mixture. An aqueous spray is added to adhere the salt grains to the pellet surfaces. With the application of a dust control agent, the salt grains are retained. Potassium levels in NPK units of from 1 to 15 are routinely achieved with greater than 90 elemental % of the potassium is from the surface decorating potassium salt grains.

6 Claims, 1 Drawing Sheet

Related U.S. Application Data

(60) Provisional application No. 61/249,051, filed on Oct. 6, 2009.

(51) Int. Cl.
*C05G 3/06* (2006.01)
*C05C 11/00* (2006.01)
*C05D 1/00* (2006.01)

(56) References Cited

U.S. PATENT DOCUMENTS

| | | |
|---|---|---|
| 3,771,994 A | 11/1973 | McConnell et al. |
| 3,939,280 A | 2/1976 | Karnemaat |
| 3,942,970 A | 3/1976 | O'Donnell |
| 4,081,366 A | 3/1978 | O'Donnell |
| 4,256,479 A | 3/1981 | Harrison |
| 4,304,588 A | 12/1981 | Moore, Jr. |
| 4,519,831 A | 5/1985 | Moore |
| 4,521,452 A | 6/1985 | Highsmith |
| 4,578,105 A | 3/1986 | Moore |
| 4,981,936 A | 1/1991 | Good, Jr. |
| 4,988,442 A | 1/1991 | Highsmith et al. |
| 5,008,319 A | 4/1991 | Highsmith et al. |
| 5,196,043 A * | 3/1993 | Wurtz ............... C02F 1/02 210/609 |
| 6,841,515 B2 * | 1/2005 | Burnham ............ C05D 9/02 424/475 |
| 6,852,142 B2 | 2/2005 | Varshovi |
| 7,662,206 B2 * | 2/2010 | Burnham ................. 71/11 |
| 7,789,931 B2 * | 9/2010 | Burnham et al. ......... 71/11 |
| 2002/0005053 A1 * | 1/2002 | Hayashi et al. ......... 71/11 |
| 2010/0300368 A1 | 12/2010 | Myers et al. |

* cited by examiner

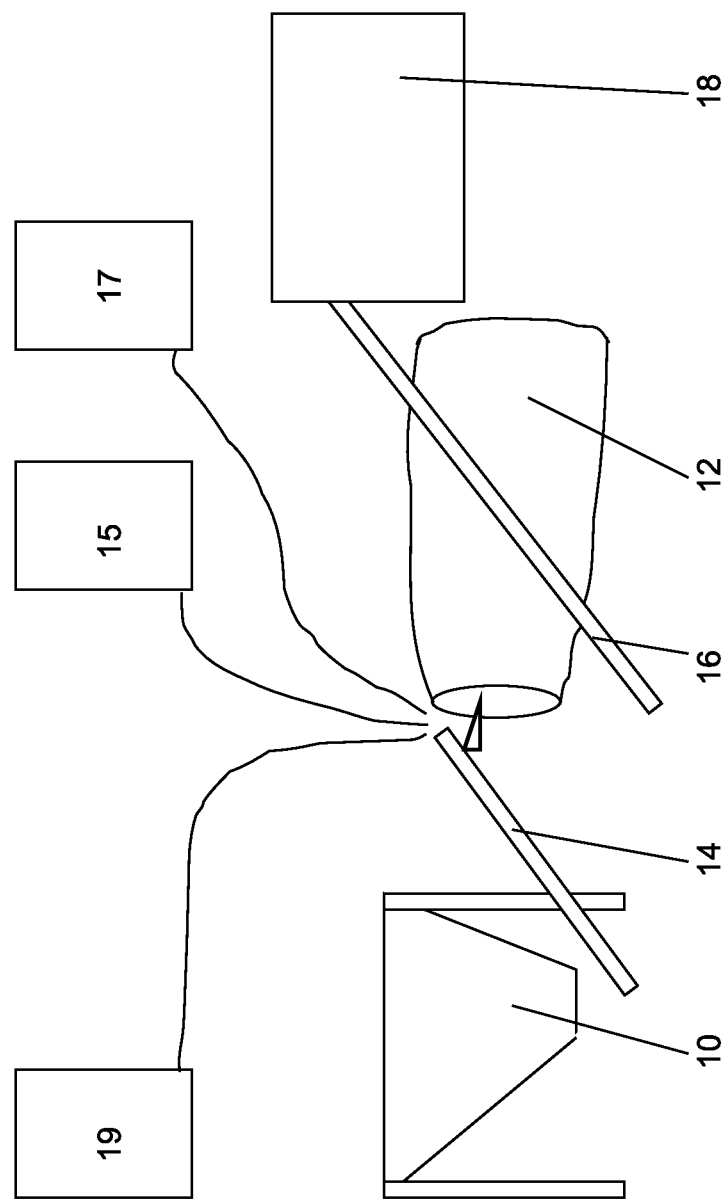

NUTRIENT ENHANCED BIOSOLIDS PELLETS

CROSS-REFERENCE TO RELATED APPLICATION

This application is a divisional of U.S. non-provisional application Ser. No. 12/898,941 filed on Oct. 6, 2010, now U.S. Pat. No. 8,617,825 B1 issuing Dec. 31, 2013; which in turn claims priority of U.S. Provisional Patent Application Ser. No. 61/249,051 filed Oct. 6, 2009, the contents of which are incorporated herein by reference.

FIELD OF THE INVENTION

The present invention in general relates to biosolids fertilizer and in particular to biosolids pellets that are enhanced with surface bound potassium salt grains.

BACKGROUND OF THE INVENTION

Biosolids are residues generated through the treatment of sewage. Biosolids are characterized by containing inorganic and organic compounds precipitated during wastewater treatment. Beneficial uses of biosolids for the nutrient content and soil amendment properties have been recognized for agricultural and recreational gardening. In spite of initial concerns as to pathogen and contaminant content of biosolids, it has been found over the past forty years of research that agronomic use of high-quality biosolids is sustainable and safe.

Application of biosolids to land either to condition the soil or fertilize vegetation affords a double benefit in enhancing soil quality while providing a less expensive alternative method of disposal for the biosolids. While biosolids typically contain appreciable amounts of essential nutrients for plant growth, and especially nitrogen and phosphorus, biosolids are characterized by generally being low in potassium as the potassium most often remains in the effluent discharge of sewage treatment. In addition to nitrogen and phosphorus, biosolids contain other essential plant nutrients such as calcium, magnesium, sulfur, boron, copper, iron, manganese, molybdenum, and zinc.

Agricultural use of biosolids while reducing fertilizer cost includes a degree of variability associated with weather conditions and crop type. Transport of biosolids and application at times that are compatible with agricultural schedules of planting, harvesting, and possible adverse climactic conditions requires careful management; and when conditions are not favorable, biosolids have traditionally been disposed of through more expensive and environmentally deleterious options such as landfill or incineration.

In response to these problems associated with biosolids, it has become more common to dry and pelletize biosolids. The city of Milwaukee has sold Milorganite® since 1926 and Granulite® that has been sold by Synagro Technologies since 1992. Dry biosolids are amenable to blending with other materials when used as organic-based fertilizer with balanced nutrient levels. Alkaline stabilization has been used to produce a nearly odorless granular product for use as a soil conditioner, fertilizer, and also as a substitute for agricultural lime. Unfortunately, alkaline stabilization or other processes of blending has proven complex and expensive while not reducing the propensity of dry biosolids to spontaneously undergo exothermic biological and chemical heating. While prior art attempts to enhance the fertilizer properties of biosolids through addition of a liquid spray and/or dry formulations applied to the biosolids, these have met with limit success owing to excessive wetting converting the biosolids to a nonspreadable sludge with limited amounts of soluble material being applied. Additionally, liquid application of supplemental potassium in particular is limited in the quantity of potassium that can be so provided. Solid additives are prone to forming inhomogeneous compositions through dusting and the density differential between the biosolids and solid additives.

Thus, there exists a need for enhanced biosolids pellets having high surface loadings of potassium salts and a process of forming biosolids pellets that have been nutrient enriched to form a balanced fertilizer while maintaining pellet stability.

SUMMARY OF THE INVENTION

A dry, flowable fertilizer is provided that includes multiple dry, flowable biosolids pellets. Each of the pellets has a pellet surface. Potassium salt grains are adhered to the pellet surfaces and a dust control agent coating is applied to retain the grains on the pellet surfaces. The resultant dry, flowable fertilizer has higher potassium loadings to the potassium salt grains than previous biosolids based fertilizers.

A process of forming a fertilizer is also provided that includes tumbling dry, flowable biosolids pellets with powdered potassium salt grains to form a mixture. An aqueous spray is added to adhere the salt grains to the pellet surfaces. With the application of a dust control agent, the salt grains are retained on the pellet surfaces to form the fertilizer and facilitate subsequent handling. Potassium levels in NPK units of from 1 to 15 are routinely achieved with greater than 90 elemental % of the potassium is from the surface decorating potassium salt grains.

BRIEF DESCRIPTION OF THE DRAWING

FIG. 1 is a schematic of a process by which an inventive fertilizer is formed.

DETAILED DESCRIPTION OF THE PREFERRED EMBODIMENTS

The present invention has utility as biosolids pellets with high potassium loadings that are operative as a fertilizer or soil amendment. Introduction of a powdered potassium salt in conjunction with a binder in a sufficient quantity yields a surface decorated dry, flowable pelletized biosolids material that is also optionally coated with a limited water content nutrient or soil amendment solids. Inventive enhanced biosolids pellets are formed by mixing dry, flowable biosolids pellets with a potassium salt powder and wetting the mixture first with an optional soil fertilizer or amendment spray followed by application of a dust control agent to form the dry, flowable fertilizer.

As used herein, "biosolids" is defined to include precipitate from a digester, municipal wastewater treatment plant, animal manure, municipal compost, and composted organic material.

A dry, flowable fertilizer of the present invention is readily formed from commercially available pelletized biosolids such as Granulite® (Synagro Technologies) by wetting such particles with powdered potassium salt grains.

Fertilizer particles retain the pellet size of the feedstock biosolids pellets and typically have a size of −4 to +40 US Sieve size. Potassium salt grains operative herein illustratively include potassium chloride, potassium sulfate, and potassium nitrate. Preferably, the potassium salt grains are potassium chloride, potassium sulfate, or a combination thereof. Potassium salt grains operative herein are sized to be smaller than the mean biosolids particle. Typical potassium salt grain sizes range from 1 to 400 microns. Potassium chloride represents a preferred source of chloride or chlorine-containing anions as biosolids pellets and typically have lower concentrations of potassium than are desired in fertilizer. Typically loading of potassium salt grains is from 10 -and 500 pounds per ton of biosolid pellets. Potassium levels in NPK units of from 1 to 15 are routinely achieved for the present invention, where greater than 90 elemental % of the potassium is from the potassium salt grains. Preferably, potassium levels of greater than 4 NPK units and more preferably greater than 5 NPK units in the inventive fertilizer are especially advantageous as a fertilizer in a number of usage applications where high potassium loadings are needed.

As biosolids are inherently deficient in potassium owing to leachates from the biosolids carrying potassium therefrom, and any water added to facilitate potassium salt grain adhesion to the biosolids pellet surface must be evaporated to retain a dry, flowable fertilizer, the spray water weight typically represents between 5 and 40 total weight of the biosolid pellet and powdered potassium salt grains. Such grains are provided at multilayer, monolayer, or submonolayer coverage.

The spray water used to adhere potassium salt grains optionally includes additional soil amendments, fertilizers, micronutrients, or additives. Preferably, these are aqueous solutions or suspensions. These illustratively include an additional nitrogen source such as urea, coated urea, ammonium nitrate, a combination thereof known as UAN, potash, methylene urea oligomers, oxamide, urea formaldehyde-based compounds, dicyandiamide, crotilidiene diurea, nitrocellulose, ammonium sulfate, calcium nitrate, and isobutylidene diurea; phosphorus sources such as metal ammonium phosphates, monoammonium phosphate, and diammonium phosphate; plant growth hormones and plant growth regulators such as cytokinins, auxins, gibberellins, ethylene, and absisic acid, and a combination of these; and biocides such as algicides, bacteriocides, defoliants, desiccants, fungicides, herbicides, insecticides, insect growth regulators, miticides, nematicides, ovicides, pesticides, pheromones, repellents, rodenticides, and a combination thereof. An exemplary spray composition is an aqueous solution of urea and ammonium nitrate (UAN).

A dust control agent is also added to a fertilizer based biosolids pellet with a pellet surface decorated with potassium salt grains. Dust control agents operative herein illustratively include inorganic solutions such as calcium chloride and magnesium chloride, naturally occurring substances such as vegetable oils, mineral oils, and other synthetic materials such as tall oils derivatives and other binding agents. While it is appreciated that an optimal quantity of dust control agent is controlled by factors such as pellet size, potassium salt grain size, and total weight percent of salt, typical loadings of dust control agents range from 0.01 to 10 total weight percent of an inventive dry, flowable fertilizer.

A process for forming inventive dry, flowable fertilizer involves tumbling preformed dry, flowable biosolids pellets with a powdered potassium salt with an aqueous spray to promote adhesion. The spray is added before, with, or after the salt. Preferably, the spray is added after intermixing. Optionally, the spray includes one or more dissolved or suspended soil amendments, fertilizers, micronutrients, or additives. Upon adhesion through tumbling for approximately 5 to 30 minutes, a dust control agent solution is added and the fertilizer dried to a dry, flowable form.

A process of forming a fertilizer according to the present invention is detailed with respect to FIG. 1. A weigh hopper 10 including biosolids pellets feeds material to a rotary drum mixer 12 by way of a conveyor 14. Potassium salt grains are also delivered to the mixer 12 via the hopper 10 and conveyor 14. While the order of loading of biosolids pellets and salt into the mixture 12 is variable, preferably the salt is placed on top of the pellets. The rotary drum mixer 12 is started and the dry products are then conveyed from the weigh hopper 10 into the rotary drum mixer 12. As the dry material is being conveyed into the rotary drum mixer 12, a liquid spray is added to the mixer 12. Optionally, the aqueous spray includes soil amendments, fertilizer components, micronutrients, and other such additives. Metering of spray into the mixer 12 is accomplished by a calibrated meter in the liquid product line extending from tank 15 and leading into the mixer 12. A nonionic surfactant is optionally added if the absorption capacity of the pellets is inadequate and the pellets are at risk of reverting to a sludge. Typical loadings of nonionic surfactant are about 1 pint per 100 gallons of spray applied. Typically, an aqueous spray is added in an amount of 5 to 100 gallons per ton of biosolids pellets. After the biosolids pellets and potassium salt grains have been placed in the mixer 12, the pellets, salt grains, and spray are mixed for a period of typically between 5 and 30 minutes. During this time, a dust control agent is sprayed into the mixer 12 to adhere the potassium salt grains to the larger biosolids pellets. Typically, the dust control agent is provided in a quantity of 1 to 20 gallons of dust control agent per ton of finished dry, flowable fertilizer, depending upon potassium salt grain size and loading. Typical quantities of dust control agent are between 1 and 5 gallons of dust control agent per ton of finished dry, flowable fertilizer. After mixing is completed, rotary drum mixer 12 is stopped and restarted in the opposite direction to unload material onto a load out conveyor for delivery or removal to a holding area for additional drying. Subsequent to drying, dry, flowable fertilizer is preferably moved to the weigh hopper 10 to allow for measurement of dry, flowable fertilizer to ensure proper quantities are being shipped. Dry, flowable fertilizer after being weighed is returned to the rotary drum mixer 12 where optionally additional dust control agent is applied to ensure product quality owing to product degradation associated with additional handling. Typical quantities of additional coating agent added at this stage are from 0 to 10 gallons per ton of dry, flowable fertilizer with 0 to 5 gallon per ton being preferred. Material entering the rotary drum blender 12 is sprayed prior to entry of the rotary drum blender 12 or within the blender 12 with a water spray optionally containing dissolved or suspended fertilizer, soil amendments, or micronutrients or other additives. Thereafter, additives such as a binder, dust control agent, or additional additive is also added to the biosolids prior to or within the blender 12 from a tank 17. Optionally, liquid nitrogen or dry ice or gaseous carbon dioxide is added to the blender 12 from a tank 19 to suppress aerobic metabolism of organisms within the biosolids during the mixing process. After mixing within the blender 12 to homogeneity, the resultant slurry is sent by conveyor 16 to a dryer 18 for drying. The resultant inventive pelletized fertilizer is dry, flowable and ready for application to soil or storage. Storage optionally occurs under an oxygen-depleted atmosphere of nitrogen, carbon dioxide, or a combination thereof.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process of forming a fertilizer comprising:
   tumbling dry, flowable biosolids pellets that each have a pellet surface with powdered potassium salt grains only on said pellet surface;
   adding an aqueous spray to adhere said powdered potassium salt grains to the pellet surface to form salt grain surface decorated biosolids pellets in an amount of NPK units of from 1 to 15 with greater than 90 elemental percent of total potassium being from said powdered potassium salt grains on the pellet surface; and
   applying a dust control agent to said salt grain surface decorated biosolids pellets to form the fertilizer.

2. The process of claim 1 further comprising reapplying said dust control agent or another dust control agent subsequent to forming the fertilizer.

3. The process of claim 1 wherein tumbling occurs in a rotary drum mixer.

4. The process of claim 1 further comprising dissolving or suspending in the aqueous spray at least one additive of a nitrogen source, a phosphorous source, a plant growth hormone, a plant growth regulator, or a biocide.

5. The process of claim 1 further comprising applying a nonionic surfactant to said dry, flowable biosolids pellets prior to or in conjunction with said adding of said aqueous spray.

6. The process of claim 1 further comprising adding one of liquid nitrogen, dry ice, or gaseous carbon dioxide to suppress aerobic metabolism of organisms within the biosolids during the forming process.

* * * * *